US005701462A

United States Patent [19]
Whitney et al.

[11] Patent Number: 5,701,462
[45] Date of Patent: Dec. 23, 1997

[54] DISTRIBUTED FILE SYSTEM PROVIDING A UNIFIED NAME SPACE WITH EFFICIENT NAME RESOLUTION

[75] Inventors: Alan Whitney; Yuval Neeman, both of Bellevue; Sudheer Koneru, Redmond; Milan Shah, Redmond; Peter J. Cook, Redmond; Arnold S. Miller, Bellevue, all of Wash.

[73] Assignee: Microsoft Corporation, Redmond, Wash.

[21] Appl. No.: 174,910

[22] Filed: Dec. 29, 1993

[51] Int. Cl.$^6$ .................................................. G06F 17/30
[52] U.S. Cl. .......................... 395/610; 395/611; 395/614; 395/616; 395/200.16
[58] Field of Search ........................... 395/600, 700, 395/800, 425, 400, 610, 611, 616, 614, 200.16; 379/88, 96, 207, 269

[56] References Cited

U.S. PATENT DOCUMENTS

| | | | |
|---|---|---|---|
| 4,825,354 | 4/1989 | Agarwal et al. | 364/DIG. 1 |
| 4,887,204 | 12/1989 | Johnson et al. | 364/DIG. 1 |
| 4,914,571 | 4/1990 | Baratz et al. | 364/DIG. 1 |
| 5,095,423 | 3/1992 | Gramlich et al. | 395/600 |
| 5,222,242 | 6/1993 | Choi et al. | 395/800 |
| 5,377,323 | 12/1994 | Vasudevan | 364/DIG. 1 |
| 5,425,028 | 6/1995 | Britton et al. | 370/94.1 |
| 5,434,974 | 7/1995 | Loucks et al. | 364/DIG. 1 |
| 5,493,607 | 2/1996 | Arumainayagam et al. | 379/88 |

OTHER PUBLICATIONS

New and improved; Nlst. (Sun Microsystems Inc.'s Network Info. Service +) ; Unix Review : Steven Baker, v11, n1, p. 21(7):Jan. 1993.

Domains; A New Approach to Distributed System Management Robinson et al., 1988 IEEE.

Mahadev Satyanarayanan, "Scalable, Secure, and Highly Available Distributed File Access"; *Computer*; pp. 9–20, May 1990.

John K. Ousterhout et al. "The Sprite Network Operating System"; *Computer*; pp. 23–36, Feb. 1988.

Bob Sidebotham, "Volumes—The Andrew File System data System Data Structuring Primitive"; *Proceedings of EUGG Autumn '86*, pp. 473–480, Sep. 1986.

Brent Welch and John Ousterhout; "Prefix Tables: A Simple Mechanism for Locating Files in a Distributed System"; *Proceedings of the IEEE Sixth Conference Distrubuted Computing Systems;* pp. 184–189; May 1986.

Thomas W. Page Jr. et al.; "Management of Replicated Volume Location Data in the Ficus Replicated File System"; *Usenix Conference Proceedings;* pp. 11–29, Summer 1991.

Richard G. Guy et al.; "Name Transparency in Very Large Scale Distributed File Systems"; *Proceedings of IEEE Workshop on Experimental Distributed Systems;* pp. 20–25; 1990.

M. Satyanarayanan.; "Distributed File System"; *Distributed Systems;* pp. 149–188, 1989.

"Uniting File Systems"; *UNIX Review;* vol. 7, No. 3; pp. 61–70, date unknown.

James J. Kistler and M. Satyanarayanan; "Disconnected Operation in the Coda File System"; pp. 213–225, 1991.

(List continued on next page.)

*Primary Examiner*—Thomas G. Black
*Assistant Examiner*—Hosain T. Alam
*Attorney, Agent, or Firm*—Seed and Berry LLP

[57] ABSTRACT

A distributed file system uses objects to model the behavior of components of the distributed file system. Each object has an associated logical path name and physical address. An aggregation of all the logical path names comprises a distributed name space which can be logically partitioned into domains. Each domain includes a domain folder object which maps logical path names of objects in the domain containing the domain folder object, into addresses in the distributed system where the objects are stored. The addresses of the objects are used to access the objects in order to retrieve information from the distributed system.

16 Claims, 15 Drawing Sheets

OTHER PUBLICATIONS

Alfred Z. Spector; "Thoughts on Large Distributed File Systems";*Proceedings of the German National Computer Conference;* pp. 1–10; Oct. 1986.

Mahadev Satyanarayanan et al., "Coda;: A Highly Available File System for a Distributed Workstation Environment"; *IEEE Transactions on Computers;* vol. 39, No. 4; Apr. 1990; pp. 447–459.

D. W. Davies et al.; "Distributed system architecture model"; Chapter 2; *Lecture Notes in Computer Science: Distributed Systems–Architecture and Implementation;* pp. 10–43, 1981.

Bruce Walker et al.; "The LOCUS Distributed Operating System"; *ACM Operating Systems Review;* vol. 17, No. 5; pp. 49–70, 1983.

Welch, Brent, and John Ousterhout, "Prefix Tables: A Simple Mechanism for Locating Files in a Distributed System, " The 6th International Conference on Distributed Computing Systems, Cambridge, Massachusetts; May 19–23, 1986; pp. 184–189.

Ousterhout, John K. et al., "The Sprite Network Operating System," *Computer;* vol. 21. (2); Feb. 1, 1988; pp. 23–36.

Cabrera, Luis Felipe et al., "QuickSilver Distributed File Services: An Architecture for Horizontal Growth," 2nd IEEE Conference on Computer Workstations, Santa Clara, CA, Mar. 7–10, 1988; pp. 23–37.

Wedde, Horst F. et al., "Distributed Management of Replicated and Partitioned Files Under Dragon Slayer," The Fourteenth Annual International Computer Software & Applications Conference, Chicago, Illinois; Oct. 31–Nov. 2, 1990; pp. 436–441.

Yeo, A. K. et al., "A Taxonomy of issues in Name Systems Design and Implementation," *Operating Systems Review;* vol. 27 (3); Jul., 1993; pp. 4–18.

FIG. 8

| Logical Path Name | Network Address | Local Address | Local Volume Flag | Local Exit Point Flag | Referral Service Flag | Interdomain Volume Flag |
|---|---|---|---|---|---|---|
| | | | | | | |
| | | | | | | |
| | | | | | | |
| | | | | | | |
| | | | | | | |
| | | | | | | |

DISTRIBUTED FILE SYSTEM PROVIDING A UNIFIED NAME SPACE WITH EFFICIENT NAME RESOLUTION

TECHNICAL FIELD

This invention relates generally to file systems and, more specifically, to a distributed file system for a distributed system.

BACKGROUND OF THE INVENTION

Existing distributed systems provide distributed file systems which are capable of retrieving files from different locations throughout the distributed system. Existing distributed systems gain access to files by mapping a logical path name which uniquely identifies the file into a physical address at which the file is stored. The logical path name of the file is intrinsically tied to the physical address of the files.

As the size of the distributed system increases it becomes more difficult, due to the sheer number of logical path names active in the distributed system, to manage the logical path names in a way which provides for efficient mappings of logical path names into physical addresses. In addition, it becomes more difficult to provide a single, consistent name space to a user of the distributed system from any location on the distributed system. Prior systems have instead provided a fragmented name space to users of the distributed system.

SUMMARY OF THE INVENTION

The difficulties of the prior art are overcome by the present invention. In accordance with one aspect of the present invention, a distributed system has a distributed name space of objects wherein each object has both a logical name that uniquely identifies the object and a corresponding address. The objects are grouped into logical domains which are organized into a hierarchical structure. Each domain may have a superior domain in the hierarchical structure and may have one or more subordinate domains in the hierarchical structure. A domain controller component is provided for each domain. Each domain controller component holds a cache such as a prefix table. The cache holds an entry for a logical name in the distributed name space for a domain controller component for any immediately superior domain. In addition, the cache also holds an entry for the logical name in the distributed name space for a domain controller in any immediately subordinate domains. Each entry for the above discussed domain controller components includes an address for the domain controller component.

A first computer component is provided in the distributed system for processing requests for information from the distributed system. The first computer component includes a second cache which stores entries for portions of the logical names in the distributed name space. Each entry includes an address of an object in the distributed system that is identified by the associated portion. The request is to access an object at the first computer component is received. The request includes a logical name corresponding to the object in the distributed system. It is determined whether a portion of the logical name is stored in the cache of the first computer component. Where it is determined that there is not an entry for a portion of the logical name in the cache of the first computer component, several steps are performed.

First, the address of the domain controller component for the domain containing the first computer component is retrieved from the cache of the first computer component. The logical name is sent to the domain controller component that contains the first computer component. An address corresponding to the logical name of the object is retrieved from the cache of the domain controller component for the domain containing the first computer component. The object is then accessed at the retrieved address.

In accordance with another aspect of the present invention a distributed system has a first storage media partition and a second storage media partition. A first file system is run on the first storage media partition to store and manage files. Similarly, a second file system is run on the second storage media partition to store and manage files. The first and second storage media partitions may be part of a same computer system, may merely constitute separate storage devices or may even be separate computers. The second file system differs from the first file system. A distributed file system is provided. The distributed file system furnishes a distributed name space that includes files in the first storage media partition and files in the second storage media partition. The distributed file system furnishes name resolution services to the first file system and the second file system. The distributed file system is transparent to the first file system and the second file system.

In accordance with a further aspect of the present invention, a distributed system runs a first network operating system on a computer system and a second network operating system on a computer system. The second network operating system differs from the first network operating system. A distributed file system is provided over the network operating systems and furnishes the distributed system with a unified distributed name space of files. The distributed file system furnishes name resolution services to the network operating systems. The distributed name space includes files stored on the computer system that runs the first network operating system and files stored on the computer system that runs the second network operating system. The distributed file system is transparent to the network operating systems.

In accordance with a still further aspect of the present invention, a distributed system has multiple components. The components of the distributed system are logically partitioned into domains. Each domain is self-contained such that it may operate independently of other domains. The distributed system runs a network operating system in a first domain that implements a security policy. The domain implements a security policy that differs from the first security policy and is independent of the distributed file system.

In accordance with an additional aspect of the present invention, a method is practiced in the distributed system. In this method, a distributed file system provides a distributed name space. At least one underlying file system is provided in the distributed system for performing file system operations. Objects upon which file system operations may be performed are visible in the distributed name space and at least one object upon which file system operations may not be performed is also visible in the distributed name space.

BRIEF DESCRIPTION OF THE DRAWINGS

FIG. 8 is a diagram illustrating the format of the prefix table in the preferred embodiment of the present invention.

DETAILED DESCRIPTION OF THE INVENTION

A preferred embodiment of the present invention provides a distributed file system. The distributed file system of the preferred embodiment of the present invention is implemented by components distributed across a distributed system. The distributed file system provides logical transparency for named objects in the file system so that the path names of objects in the system are not intrinsically tied to their physical location. In addition, the distributed file system organizes a name space for the distributed system into a single logical tree structure. The distributed file system partitions the distributed system into administrative domains (which will be described in more detail below) which may each implement separate administrative and security policies. The security policy practiced by a domain may be independent of the distributed file system. The distributed file system provides a super structure for "tying" together portions of the distributed system having heterogeneous file systems and heterogeneous network operating systems. The distributed file system provides name resolution services to the file systems and the network operating system, but the distributed file system is transparent to the file systems and the network operating system.

Figure 1:
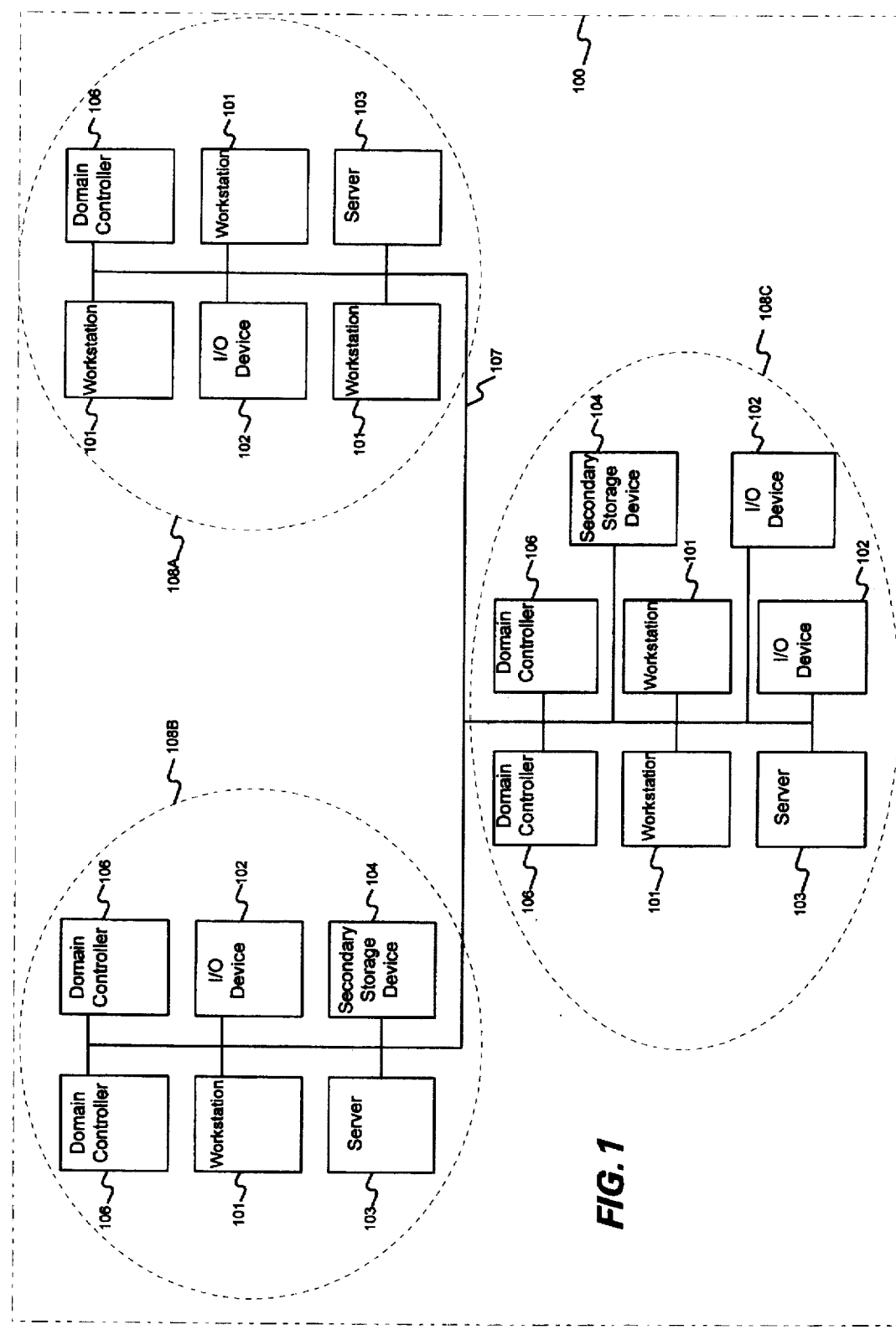
FIG. 1 is a block diagram of a distributed system for practicing a preferred embodiment of the present invention.

FIG. 1 is a block diagram of a distributed system 100 that is suitable for practicing the preferred embodiment of the present invention. Those skilled in the art will appreciate that the distributed system configuration shown in FIG. 1 is merely illustrative. Other distributed system configurations may also be used to practice the present invention.

The distributed system 100 includes workstations 101, input/output (I/O) devices 102, network servers 103, secondary storage devices 104, and domain controllers 106.

The workstations 101 and networks servers 103 may include internal memory, a processor, and other components. The network servers 103 run network operating systems. The secondary storage devices 104 may include disk drive devices or other suitable secondary storage components. It should be appreciated that software and data are stored within the internal memory of the workstations 101 and the domain controllers 106. In addition, software and data are, likewise, stored in the secondary storage devices 104.

The components included in the distributed system 100 are logically partitioned into domains 108A, 108B and 108C, wherein each domain includes a subset of the hardware and software components of the distributed system 100. Each domain may include one or more networks running network operating systems. A domain 108A, 108B or 108C may correspond with an administrative portion of an organization. A domain 108A, 108B and 108C is a self-contained and self-sufficient unit for purposes of administration and security. Domains facilitate scaling of the distributed system 100 so that components may be readily added or removed from the system.

In order to more fully understand the notion of a "domain," it is helpful to consider an example. Suppose that a distributed system is used in a corporation having multiple departments. In such an environment, a first domain contains the hardware and software components of the corporation's product development department, whereas a second domain contains the hardware and software components of the corporation's marketing department. A third domain contains the hardware and software components of the corporation's finance department, and a fourth domain contains the hardware and software components of the corporation's sales department.

Figure 2:
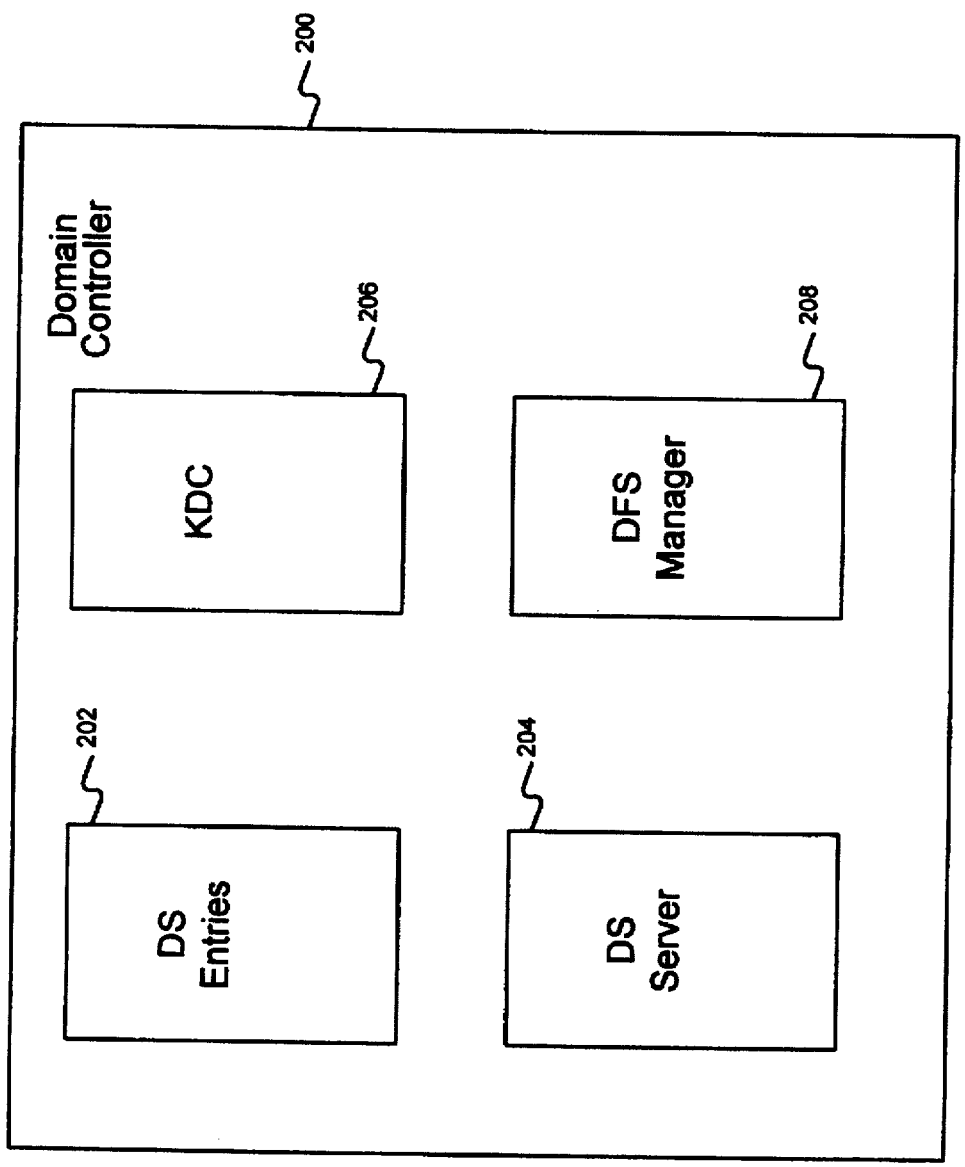
FIG. 2 is a more detailed block diagram of a domain controller of FIG. 1.

Each domain includes at least one domain controller 106. Multiple domain controllers 106 may be provided within each domain (see domain 108B, for example) so as to enhance availability and to provide load balancing of domain controller resources. Each domain controller is a distinguished machine. FIG. 2 is a block diagram showing several major functional components of a domain controller 200. Each domain controller within the distributed system 100 includes the functional components shown in FIG. 2 as well as additional components. The functional components within each domain controller 200 include directory service (DS) entries 202, which provide directory service information. Each domain controller also includes a directory service (DS) server 204. The DS server 204 is responsible for mediating access to the DS entries 202. The DS entries 202 provide the naming service for the distributed file system and are described in more detail in copending application entitled "Unification of Directory Services With File System Services," Ser. No. 08/175,063, which is assigned to a common assignee with the present application.

A key distribution center (KDC) 206 is provided in the domain controller 200 and plays a role in maintaining security within the domain. A distributed file system (DFS) manager 208 is provided in the domain to manage knowledge about the distributed file system and the volumes (described in more detail below) contained within the domain. The distributed file system manager 208 also provides functionality for facilitating distributed name resolution. Distributed name resolution involves resolving a name in a distributed name space to a physical address. The distributed file system manager 208 additionally provides management for a prefix table (described in more detail below) and management for knowledge about the file system.

Before discussing the distributed file system in more detail, it is helpful to first introduce several concepts. An "object" is a logical structure that includes data structures for holding data and may include functions that operate on data held in the data structures. An object may hold just data without including any functions. In the distributed file system, both hardware components and software components may be modeled as objects. Modeling the data processing resources as objects insulates programs from needing to know the particulars of the resource.

The objects provided within the distributed system 100 are stored in file system constructs known as "volumes". The volumes are organized hierarchically (as will be described in more detail below). A volume is a unit of physical storage supporting a file system and a set of files and directories which comprise a persistent store of objects. Each domain has its own volumes that hold objects for the domain and that define a name space that is local to the domain.

Each volume has an associated volume object that holds information that allows distributed name resolution to be performed on the volume. Each volume object describes a single volume with a single entry path. The information includes an entry path to the volume and the identity of a file server for handling requests to access the volume. Volume objects also store the entry paths for domains immediately superior to and immediately subordinate to the domain containing the volume object. Entry paths for all volumes in the domain containing the volume are also stored therein.

Figure 3:
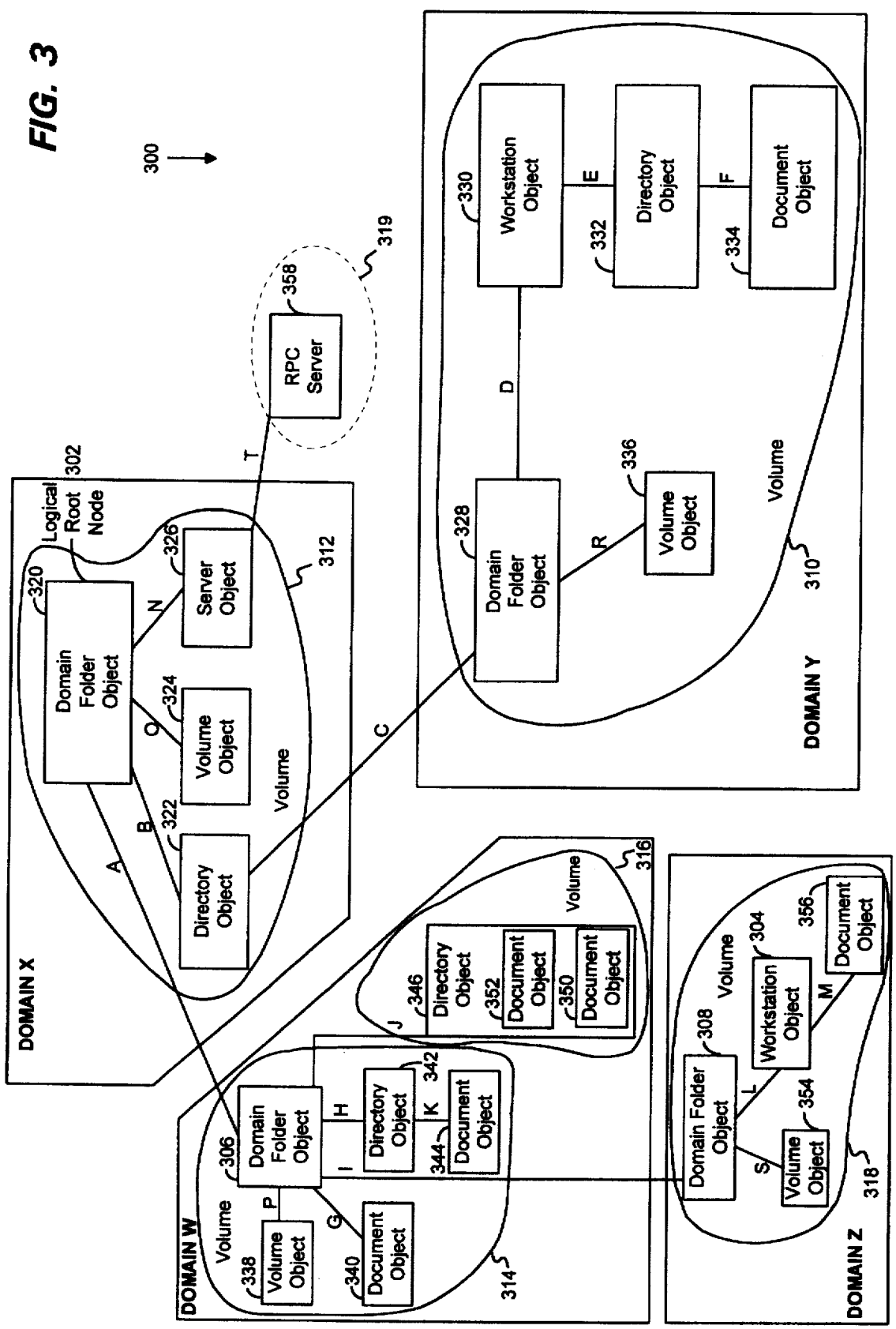
FIG. 3 illustrates a simplified example of distributed name space for the preferred embodiment of the present invention.

The names of objects in the distributed system are organized into a distributed name space. FIG. 3 shows a simplified example of such a distributed name space 300 for a distributed system. The distributed file system makes the distributed name space visible. The distributed name space 300 is a single logical tree structure that graphically represents the named objects of the distributed system. The single tree structure provides a place for centralizing knowledge about the system and facilitates access to the entire name space. The distributed file system hides junctions between machines and domain so that the distributed system appears seamless. Thus, the differences between file systems present in the system and the differences between network operating systems present in the system are hidden in the distributed name space. Each name in the distributed name space 300 corresponds to an object within the distributed system. The domain folder objects each correspond with a domain controller. Each arc (see FIG. 3) of the distributed name space 300 corresponds to a portion of a path in the name space. The objects visible in the distributed name space need not all be file system objects; rather, non-file system objects that are not available for file system operations, such as a remote procedure call (RPC) server 358, may also be present in the distributed name space.

The objects in the distributed name space may be divided by domain as shown in FIG. 3 (note Domains W, X, Y and Z). It is worth noting that not all objects need be part of a security policy of a domain. Hence, there may be machines, collections of objects or peripherals that lie outside trust policies of any domain. For instance, RPC server 358 is not part of a domain. The objects in a domain form a sub-tree of the distributed name space. Thus, domain X includes domain folder object 320, directory object 322, volume object 324 and server object 326. Domain Y includes domain folder object 328, workstation object 330, directory object 332, document object 334 and volume object 336. Domain W includes domain folder object 306, volume object 338, document object 340, directory object 342 and document object 344. Domain W also includes directory object 346. Directory object 346 contains document objects 350 and 352. Lastly, Domain Z includes domain folder object 308, workstation object 304, volume object 354 and document object 356.

The logical path name identifies an object, volume or other component within the distributed name space 300. The distributed file system of the preferred embodiment of the present invention provides a vehicle for resolving the logical path name to a physical address.

The objects held for each domain may be divided into one or more volumes. For example, domain Y includes volume 310. Domain X includes volume 312; domain W includes volumes 314 and 316; and domain Z includes volume 318.

Two volumes are connected via logical constructs known as "junction points." Junction points are composed of an "entry point" and an "exit point." An "entry point" is a logical path name which corresponds to the root of the name space for a volume or domain. For example, the logical path name "\b\c" corresponds to the root of volume 310 which is logically contained within domain Y. An "exit point" is a logical path name which corresponds to a point in the distributed name space at which another volume is attached. For example, the logical path name "\a" is an exit point from volume 312 of domain X into volume 314 of domain W. In the preferred embodiment, a given volume can have multiple exit points but can only have one entry point. "External junction points" join name spaces which are not available for file system operations with the distributed name space 300. In FIG. 3, an external junction point joins name space 319 with volume 312. It should be appreciated that external junction points permit gluing of external name spaces into the distributed file system.

"Logical roots" are programming invariants that refer to a point in the distributed name space 300. Logical roots are used to gain access to files and objects through the distributed name space 300. Logical roots are context-sensitive in that a same logical root may resolve to different addresses on different machines. Logical roots typically identify the root of a domain, the root of a machine's name space, or the root of all domains. Logical roots are shortcuts for directly accessing an object in the tree that forms the distributed name space 300 without having to traverse the direct lineal ancestor objects. For example, FIG. 3 illustrates that the logical path name "\b\c" is an entry point into domain Y. Such a logical path name may be associated with a logical drive letter such as "D:\," in order to create a logical root. In this way, logical path names, such as "\b\c\d", may be accessed using the path name "D:\d". Hence, the distributed name space 300 of FIG. 3 may be traversed beginning at an object other than logical root node 302. Logical roots are used to access objects throughout the distributed name space.

Figure 4:
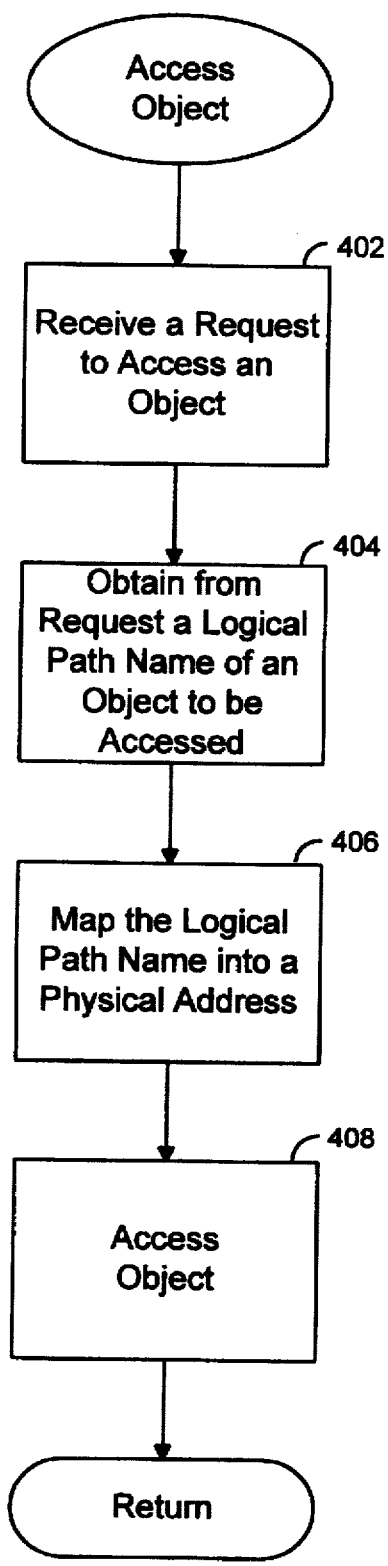
FIG. 4 is a flow chart illustrating the steps performed by an access object routine in the preferred embodiment of the present invention.
Figure 5:
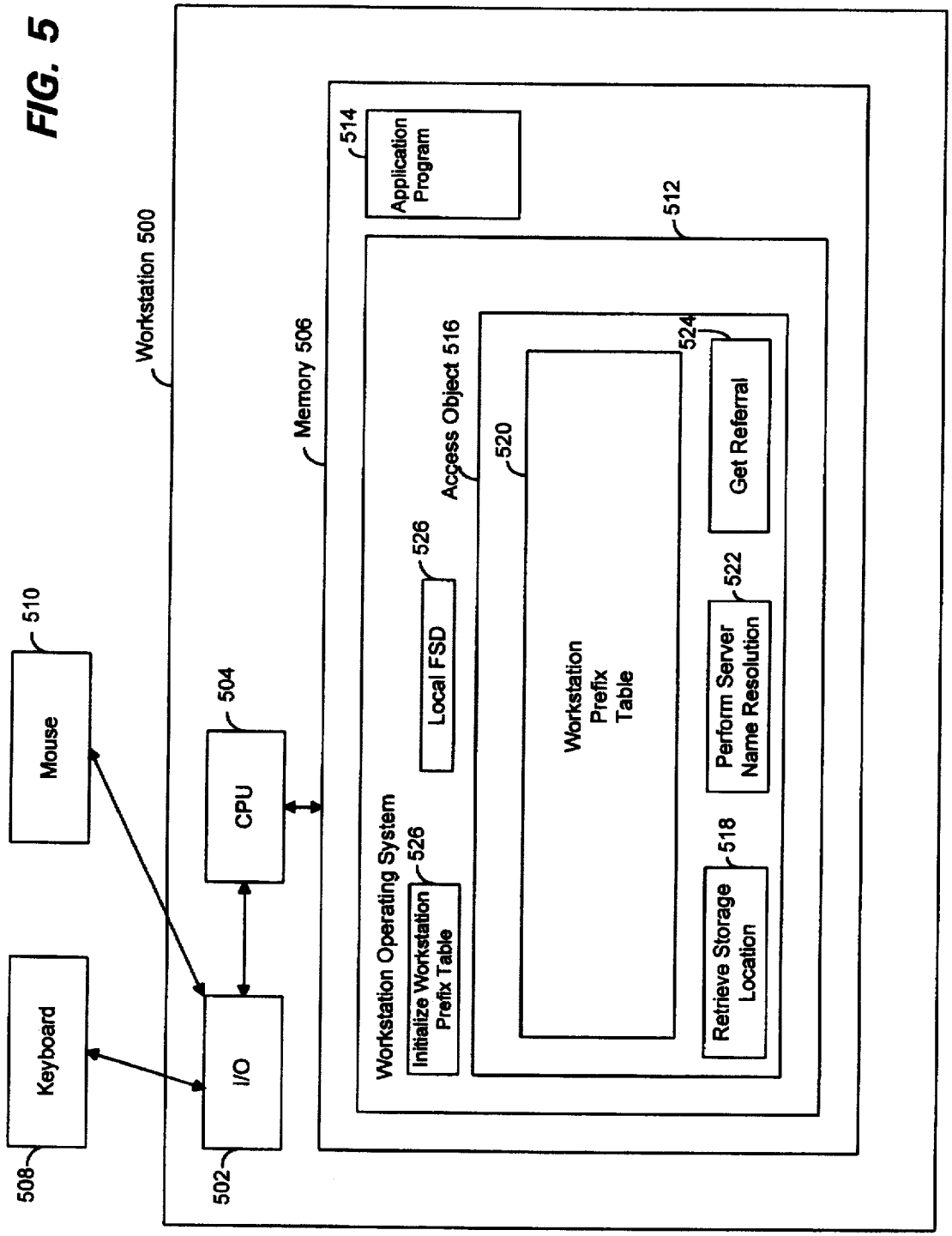
FIG. 5 is a more detailed block diagram of a workstation in accordance with the preferred embodiment of the present invention.

As mentioned above, the preferred embodiment of the present invention uses these logical path names (which may include a logical root) to access objects in the distributed system 100 (FIG. 1). FIG. 4 illustrates (from a high level perspective) the steps performed to access an object when a request to access the object when a request to access the object originates at a workstation. Copies of the access object routine are preferably stored on all workstations 101 of the distributed system 100 and on all domain controllers 106 of the distributed system 100. Initially a request to access an object is received (step 402). For purposes of illustration, suppose that the request originates from workstation 500 shown in FIG. 5. The workstation 500 includes an input/output (I/O) unit 502, a central processing unit (CPU) 504, and a memory 506. In addition, the workstation 500 is connected to a keyboard 508 and a mouse 510. The workstation memory 506 holds a copy of a workstation operating system 512, and at least one application program 514. The operating system 512 includes the access object routine 516; and a local file system driver 526 that is responsible for managing the local file system. The memory 506 also holds four other routines 518, 522, 524 and 526 which will be described in more detail below.

The request to access the object is forwarded to the CPU 504 of workstation 500. The CPU 504 executes the access object routine 516 and begins processing to fulfill the request. The request may originate from the application program 514 or from the operating system 512. For example, suppose that a query request is entered on keyboard 508 or on mouse 510. The query request to query an object is received by the input/output unit 302, which transfers the query request to the CPU 504. The CPU 504 extracts a logical path name of the object to be accessed (step 404). The logical path names, rather than the physical addresses, are provided by such requests. Accordingly, the logical path name must be converted into a physical address in the distributed system 100 that identifies where the object is stored (step 406). In other words, distributed name resolution must be performed. The operations entailed in this step will be discussed in more detail below. The object at the resulting physical address is then accessed (step 408). It should be appreciated that the object may be located in the same domain as the workstation or may be located remotely at another domain or generally outside the domain.

Figure 6:
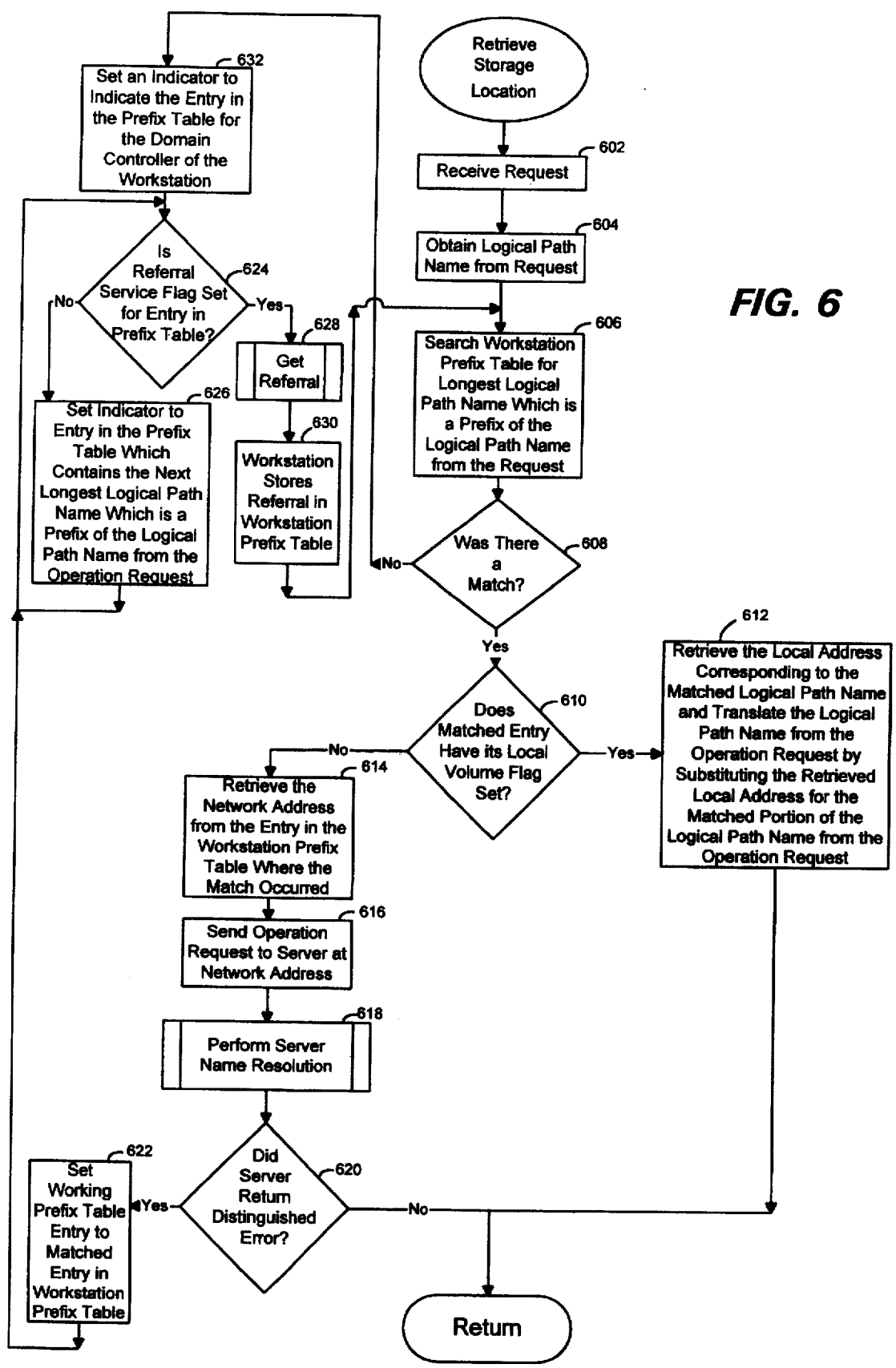
FIG. 6 is a flow chart of a retrieve storage location routine used in the preferred embodiment of the present invention.

The distributed file system performs the distributed name resolution required by step 406. FIG. 6 is a flow chart of a retrieve storage location routine 518 which performs the mapping of the logical path name of an object to a physical address for the object in the distributed system 100 (i.e., step 406 of FIG. 4). Copies of the retrieve storage location routine 518 are preferably stored in all of the workstations 101 (FIG. 1) and domain controllers 106 of the distributed system 100.

Initially, the retrieve storage location routine 518 receives the request to retrieve information from the distributed system 100 (step 602). For purposes of illustration, it is assumed that the retrieve storage location routine 518 of the workstation 500 receives the request to retrieve the information from a local site in the distributed system 100. The logical path name for the object to be accessed is obtained from the request (step 604). A workstation prefix table 520 of the workstation 500 is searched to determine if an entry for the logical path name obtained from the request is stored (step 606) in the prefix table.

The workstation prefix table 520 is only one example of a prefix table data structure. Each domain controller 106 includes a prefix table as well. FIG. 8 shows the format of a prefix table 800 in more detail. The prefix table 800 acts as a cache for holding addresses for logical path names that have already been resolved. The prefix table 800 is used to map logical path names of objects into physical addresses in the distributed system. It should be appreciated that volumes have associated volume objects and hardware components typically have associated objects that receive requests to access the volumes and components, respectively. A separate row or entry 802 is provided for each logical path name held within the prefix table 800. Each row 802 includes a number of columns 804. Each column 804 holds a separate field. Column 806 holds the logical path name that uniquely identifies an object within the distributed name space. Column 808 holds a string associated with the logical path name of column 806 that is meaningful to an underlying network operating system (such as Microsoft LAN Manager, sold by Microsoft Corporation of Redmond, Wash.). The distributed file system of the preferred embodiment of the present invention is not a traditional network operating system but rather is independent of the network operating system and serves as a super-structure for tying together individual network operating systems.

Column 810 holds a local address that is meaningful to a local network operating system server or to a local file system. Column 812 holds a local volume flag. The local volume flag indicates whether the logical path name of the row 802 identifies a volume of the workstation that the user is logged onto. Column 814 holds a local exit point flag. The local exit point flag indicates whether the logical path name of the row 802 represents an exit point for a local volume. Column 816 holds a referral service flag that indicates whether the logical path name of the row 802 represents a logical path name for a domain folder object. Lastly, column 818 holds an inter-domain volume flag. The inter-domain volume flag is set whenever the volume having the logical path name of the row 802 is stored in a domain outside of the domain containing the prefix table.

If all the logical path names of the distributed name space 300 for the distributed system 100 were stored in the workstation prefix table 520, then the mapping of the logical path name for the object would only entail a simple lookup of the logical path name and a retrieval of the corresponding address. However, as the distributed system 100 expands into a system with thousands or even tens of thousands of hardware and software components modeled as corresponding named objects, the distributed name space 300 expands correspondingly. Management of a single prefix table for such an extensive distributed system becomes impractical due to the sheer size of such a prefix table.

In step 606, the retrieve storage location routine 518 searches the workstation prefix table 520 for the longest logical path name which is a prefix of the logical path name from the request. In other words, the workstation 500 first wants to discover whether it already possesses the requisite knowledge to complete name resolution for the logical name. The notion of a prefix for a logical path name is perhaps best explained by example. For example, "\a\b" is a prefix of logical path name "\a\b\c". The longest matching prefix found in step 606 may be equivalent to the entire logical path name or may match only a leading portion of the logical path name. In step 608, the retrieve storage location routine 520 determines if there was a match between the logical path name from the request and a logical path name in the workstation prefix table 520 (i.e., was there a prefix that matched a leading portion of the logical name). If there was a match, it is determined whether the matched entry in the workstation prefix table 520 has its local volume flag set in column 812 (step 610). In other words, it is determined whether the object having the logical path name is within a local volume for the workstation. If the local volume flag is set, the local address is retrieved from column 810 of the prefix table and the logical path name from the request is translated by substituting the retrieved local address for the matched portion of the logical path name (step 612). Control is then returned to the access object routine 516 (see FIG. 4).

If in step 610 it is determined that the matched entry does not have its local volume flag set, the workstation 500 must look elsewhere to resolve the logical name to a physical address and, hence, the network address associated with the logical path name is retrieved from column 808 in the workstation prefix table 520 (step 614). The request to access the object is then sent indirectly to a network server at the retrieved network address (step 616). The request is actually sent to a redirector that then sends the request to the network server. The perform server name resolution routine 522 is then called to perform name resolution at the server (step 618).

Figure 7:
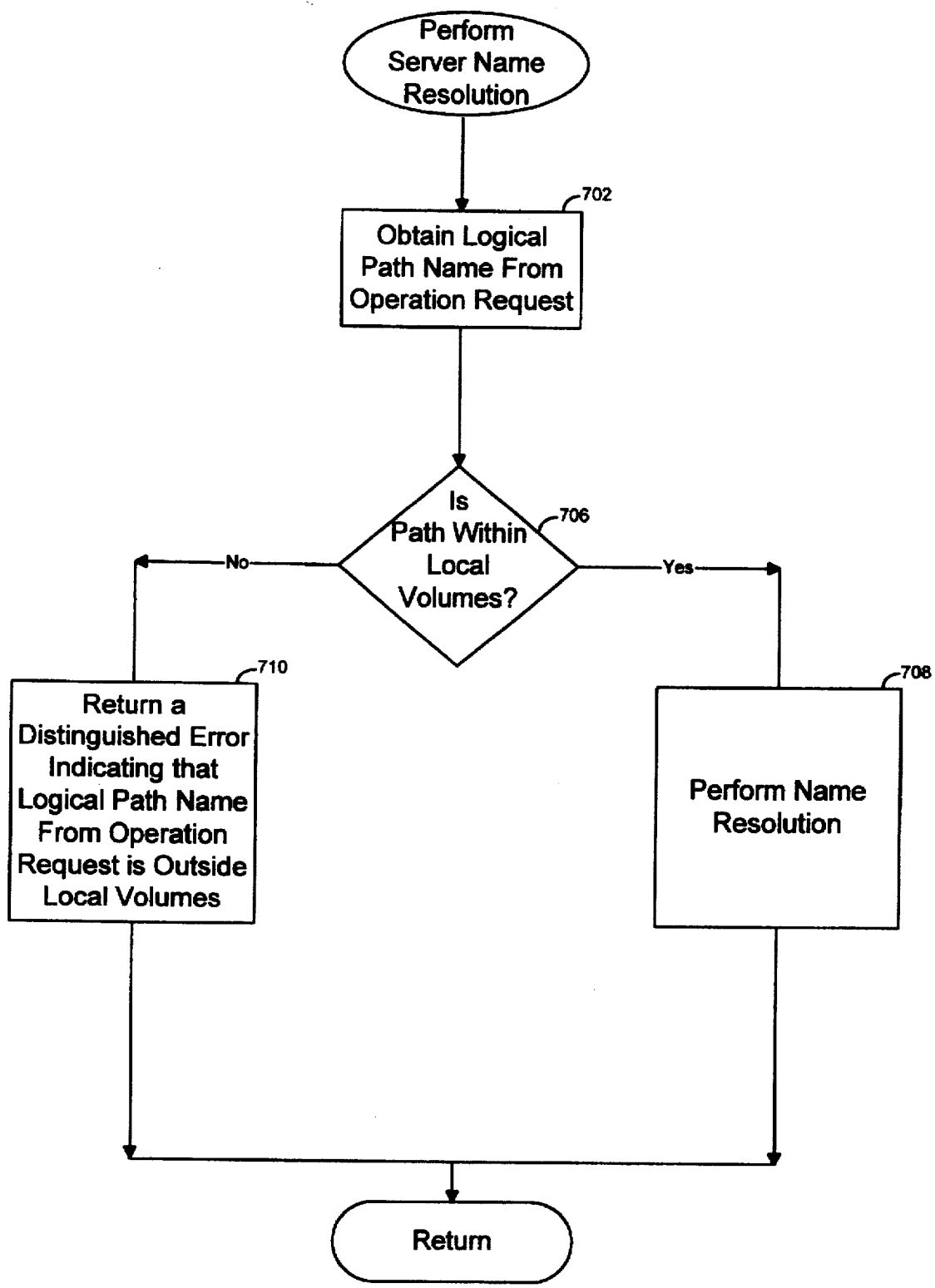
FIG. 7 is a flow chart of the perform server name resolution routine of the preferred embodiment of the present invention.

FIG. 7 shows a flow chart of the steps performed by the perform server name resolution routine 522. A logical path name is obtained from the request to access the object that is sent to the server (step 702). The network server 103 determines whether the path refers to local volumes (step 706). If the path is within the local volumes of the network server 103, name resolution is performed by the network server 103 (step 708). The network server accesses the information held in the server's prefix table to perform name resolution. Upon completion of step 708, the perform server name resolution routine 522 returns processing control to the retrieve a storage location routine 518.

If in step 706 it is determined that there was not a match between the logical path name and any of entries in the server prefix table for a local volume, a distinguished error is returned to the originating workstation to indicate that the logical path name from the request is outside the distributed name space included within any local volume on the server (step 710). Upon completion of step 710, processing control is returned to the retrieve a storage location routine 518 at step 620.

After the server name resolution routine 522 is performed (step 618), a determination is made whether the server returns a distinguished error (step 620). If the server returns a distinguished error, a working prefix table entry (identifying the prefix table entry that is currently of interest) is set as the entry in the prefix table of the server where the match occurred (step 622).

In step 624, a determination is made whether the working prefix table entry refers to a domain controller and, hence, can issue referrals. A referral is a packet of information about a volume that includes an entry path for the volume, a provider ID that identifies a file system driver that may be called to access the volume and a service address that is either given to a network provider to talk with the distributed file system or refers to another addressing mechanism. A determination is made whether the working prefix table entry has its referral service flag (column 816) set. If the working prefix table entry indicates that referrals cannot be issued, the working prefix table entry is changed to the entry in the prefix table which contains the next longest logical path name that is a prefix of the logical path name from the request (step 626). Processing then repeats, as described above, beginning with step 624. These steps look for the next best prefix to find a domain controller that can issue a referral.

In step 624, if the working prefix table entry indicates that referrals can be issued (i.e., the working prefix table entry refers to a domain container), then in step 628, a get referral routine 524 is called to get a referral (step 628). This routine will be described in more detail below. The workstation then stores the information derived from the referral in the prefix table 520 (step 630).

If at step 608 it is determined that the prefix table does not contain a matching prefix for the logical path name contained within the request, the workstation 500 then looks for help from the domain controller. Specifically, the working prefix table entry is set to refer to the prefix table of the domain controller of the domain containing the workstation from which the request originated (step 632). The steps described above beginning at step 624 are then repeated at the domain controller until the logical path name is resolved to an address.

Figure 9:
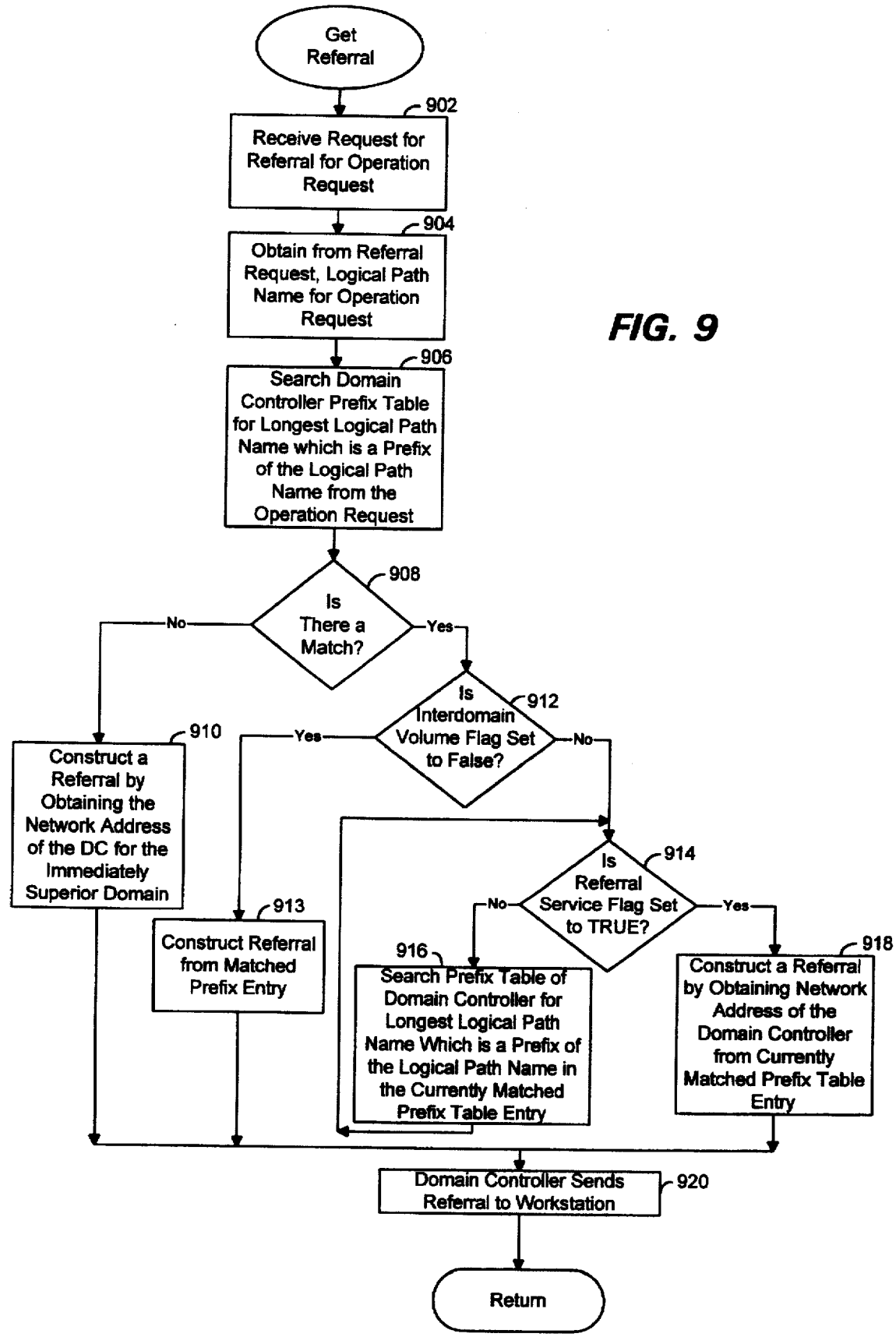
FIG. 9 is a flow chart of the steps performed by the get referral routine in the preferred embodiment of the present invention.

FIG. 9 is a flowchart of the steps performed by the get referral routine 524. Initially, in step 902, the request for a referral is received at the domain controller associated with the working prefix table entry. The logical path name for the object to be accessed is extracted from the request (step 904). The prefix table at the domain controller that received the request is searched under the control of the DFS manager 208 for the longest logical path name which is a prefix of the logical path name from the referral request is searched (step 906). A determination is then made if there is a match between any of the prefixes in the table and the logical path name (step 908). If there is not a match, then in step 908, a referral is constructed by obtaining the network address (i.e., held in column 808 of the prefix table) for the domain controller of the immediately superior domain (step 910). The referral is sent from the domain controller to the workstation that requested the referral (step 920). Control then returns to the retrieve a storage location routine 518.

If in step 908 it is determined that there is a match, then it is determined whether the matched logical path name refers to a volume outside the domain of the domain controller, by checking whether the inter-domain volume flag is set as "False" (step 912). If the inter-domain volume flag is set as "False", a referral is constructed from the matched prefix table entry (step 913) and the referral is forwarded to the workstation holding the desired volume (step 920). If the inter-domain volume flag is set to "True", then processing continues with step 914.

In step 914, the referral service flag is checked. If the referral service flag is set to "False", the prefix table of the domain controller is searched for the longest logical path name which is a prefix of the logical path name in the currently matched prefix table entry (step 916). Processing continues by repeating step 914 (described above).

If in step 914 it is determined that the referral service flag is set to "True", a referral is constructed by obtaining the network address of the domain controller from the currently matched prefix table entry (step 918). Upon completion of step 918, processing continues with step 920 wherein a referral is sent to the workstation which requested the referral. Control then returns to the retrieve a storage location routine 518.

As mentioned above, prefix tables are stored in each workstation 101 and each domain controller 106. Each variety of prefix table must be initialized. The prefix table of a domain controller is initialized with data retrieved from volume objects representing volumes in the domain, which stores the corresponding domain folder object.

Figure 10:
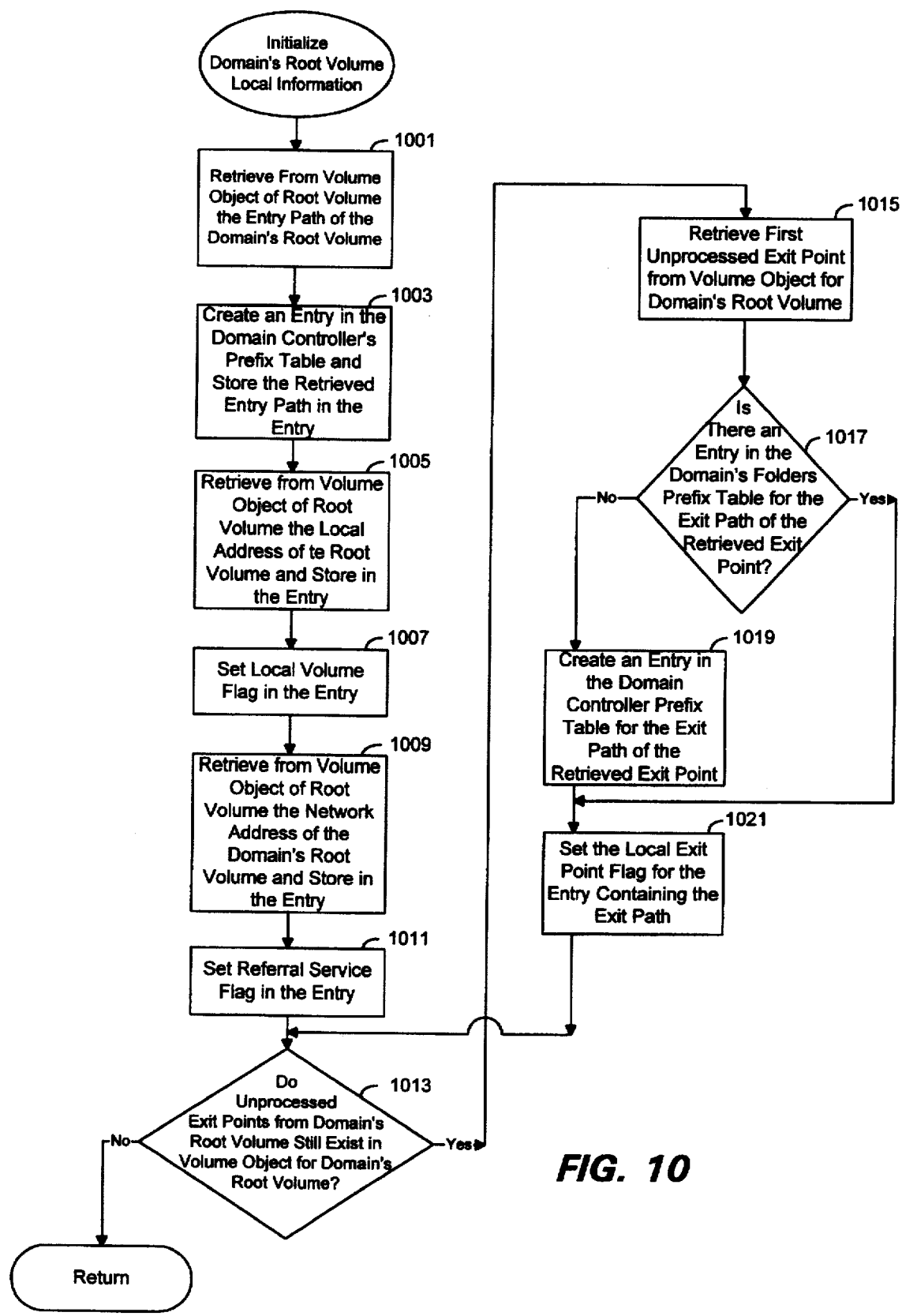
FIG. 10 is a flow chart of steps performed by the initialize domain root volume local information routine of the preferred embodiment of the present invention.
Figure 11:
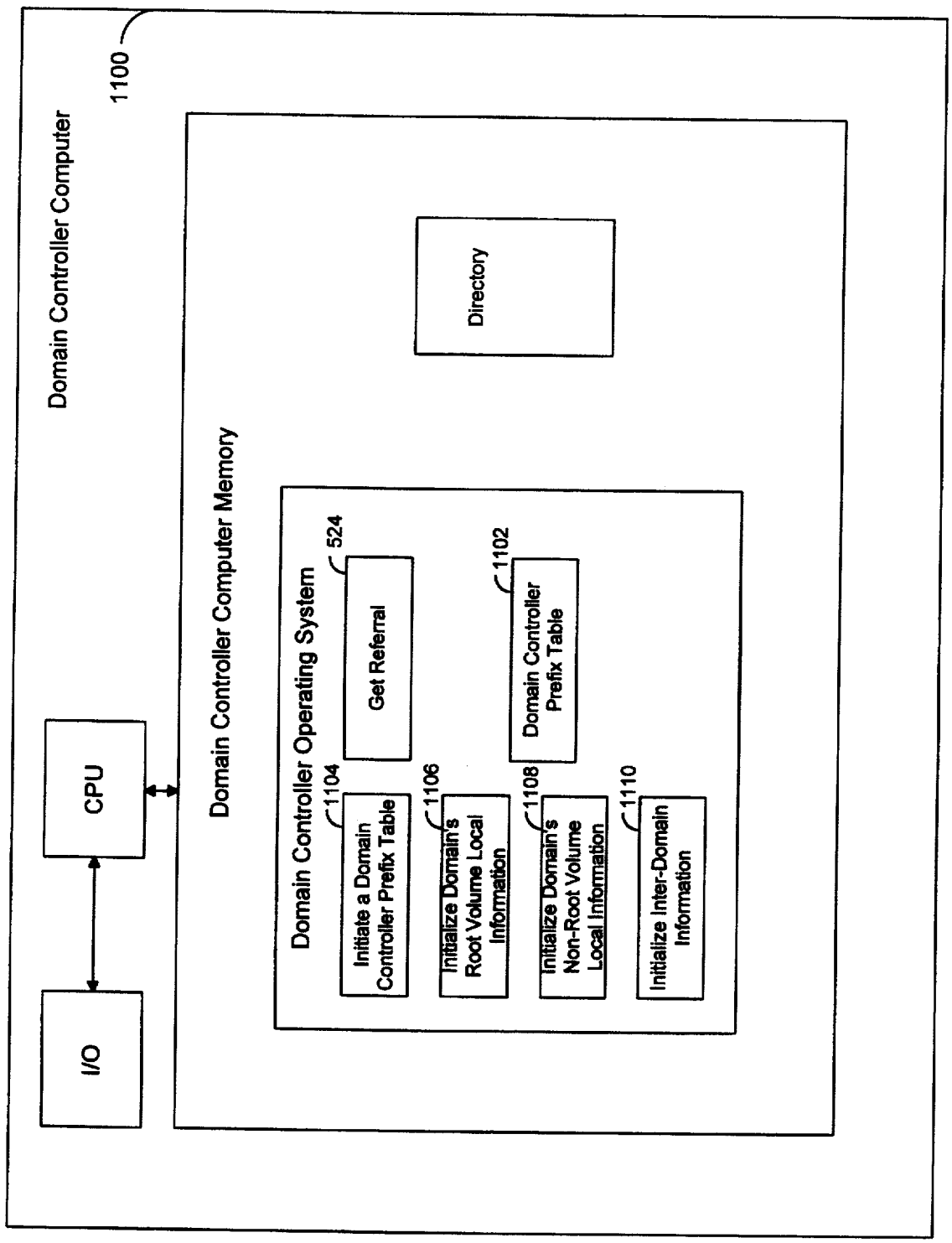
FIG. 11 is a block diagram of a domain controller in accordance with the preferred embodiment of the present invention.
Figure 15:
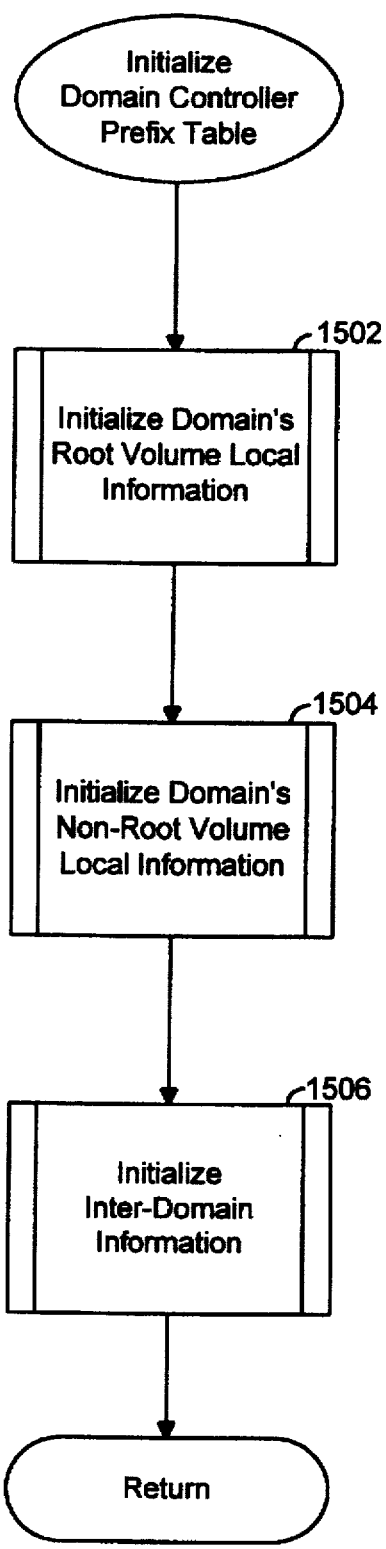
FIG. 15 is a flow chart of the steps performed by the initialize domain controller prefix table routine of the preferred embodiment of the present invention.

FIG. 15 illustrates the steps performed by an initialize a domain controller prefix table routine 1104, which initializes prefix tables in domain controllers using data stored in volume objects. FIG. 11 illustrates several components of a domain controller 1100 that are used in such initialization. In step 1502, the initialize domain's root volume local information routine 1106 is called. FIG. 10 illustrates the step performed by this routine 1106. In step 1001, the entry path of the domain's root volume is retrieved from the volume object of the root volume for the domain containing the domain controller 109. An entry is created in the domain controller prefix table 1102 and the retrieved entry path is stored in the created entry (step 1003). The local address of the root volume is retrieved from the volume object of the root volume and the local address is stored in the entry (step 1005). The local volume flag 812 in the entry is set (step 1007). In step 1009, the network address of the domain's root volume is retrieved from the volume object of the root volume, and the network address is set (step 1007) in the entry of the domain controller prefix table 1102. In step 1011, the referral service flag 816 in the entry of the domain controller prefix table 907 is set. The volume object is searched for the domain's root volume to determine if unprocessed exit points for the domain's root volume still exist (step 1013). Exit points for the domain root volume are determined by simply examining the entries loaded into the prefix table of the domain controller for all domain volume objects. If unprocessed exit points exist in the volume object, processing continues with steps 1015 through 1021.

In step 1015, the first unprocessed exit point is retrieved from the volume object for the domain's root volume. In step 1017, it is determined whether there is an entry in the domain controller prefix table 1102 for the exit path of the retrieved exit point. If there is not an entry in the domain controller prefix table 1102 for the exit path, then an entry is created in the domain controller prefix table 1102 for the exit path of the retrieved exit point. Upon completion of step 1019, processing continues with step 1021. If in step 1017, an entry in the domain controller prefix table 907 for the exit path of the retrieved exit point is found, processing continues with step 1021. In step 1021, the local exit point flag for the entry containing the exit path for the exit point retrieved in step 1015 is set. Upon completion of step 1021, processing continues with step 1013.

In step 1013, it is determined whether all exit points for the domain's root volume have been processed. If not, control returns to the initialize a domain controller prefix table routine 1104.

Once the domain controller prefix table 1102 has been initialized with the domain's root volume local information, the initialize a domain controller prefix table routine 1104 invokes the initialize a domain's non-root volume local information routine 1108 (step 1504). This routine 1108 retrieves the entry path and network address of the non-root volume from each volume object for a non-root volume of the domain. In addition, this routine stores each retrieved entry path and network address in the domain controller prefix table 1102.

Figure 12:
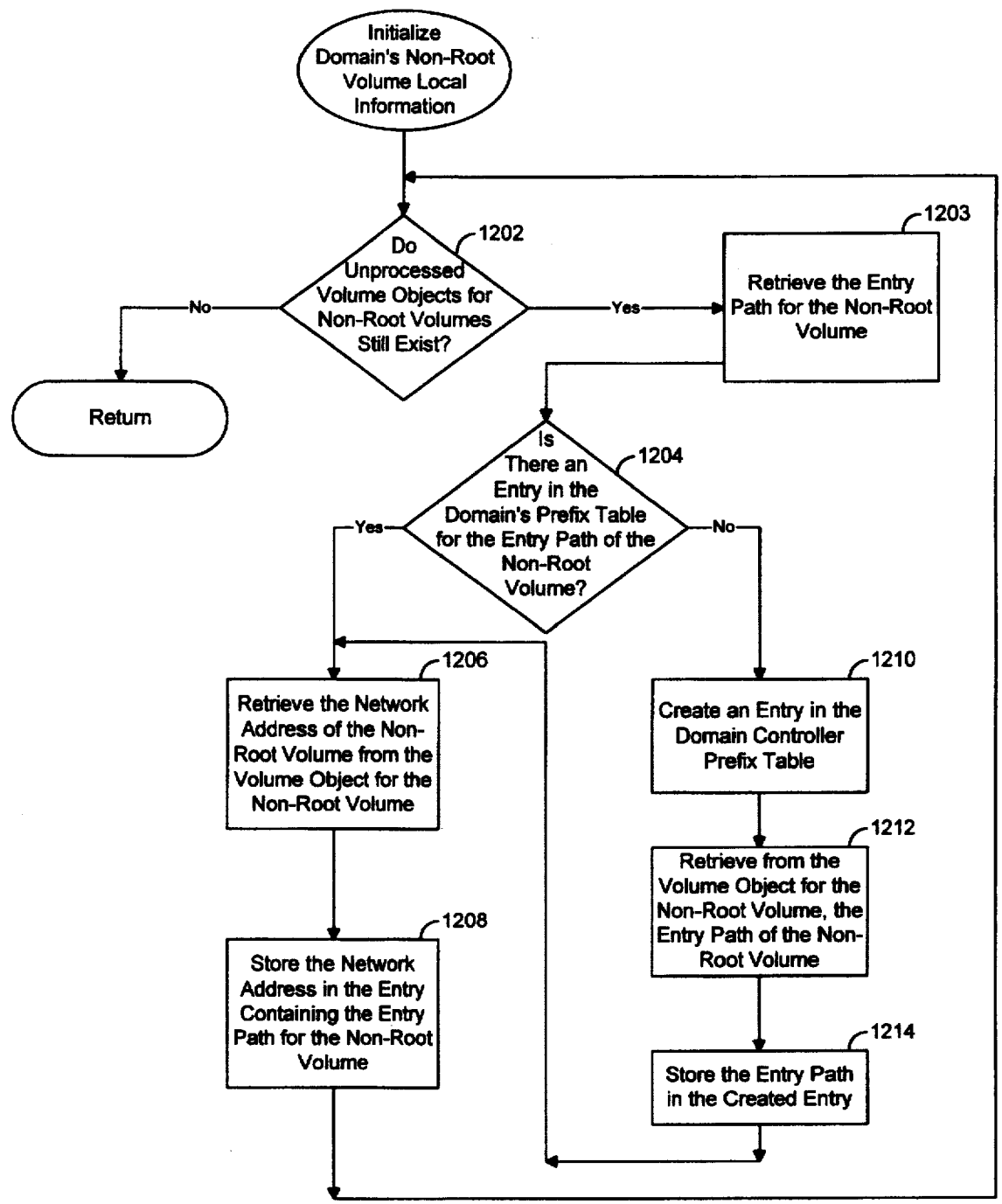
FIG. 12 is a flow chart of the initialize domain non-root volume local information routine of the preferred embodiment of the present invention.

FIG. 12 illustrates the preferred steps of the initialize a domain's non-root volume local information routine 1108. A determination is made whether any unprocessed volume objects for non-root volumes in the domain still exist (step 1202). If unprocessed volume objects exist, the entry path for the non-root volume is retrieved (step 1203) and a determination is made whether there is already an entry in the domain controller prefix table 1102 for the entry path of the non-root volume associated with the first unprocessed volume object (step 1204). If there is not an entry in the domain controller prefix table 1102 for the entry path of the non-root volume, an entry is created in the domain controller prefix table 1102 (step 1210). The entry path of the non-root volume is retrieved from the volume object for the non-root volume (step 1212). The entry path is stored in the created entry of the domain controller prefix table 1102 (step 1214). Upon completion of step 1213, processing continues with step 1206. If in step 1204, it is determined that the domain controller prefix table 1204 contains an entry for the entry path of the non-root volume, processing 1102 continues with step 1206. In step 1206, the network address of the non-root volume is retrieved from the volume object. The retrieved network address is stored in the entry of the domain controller prefix table 1102 containing the entry path for the non-root volume (step 1208). Upon completion of step 1208, processing continues again with step 1202.

If in step 1202 it is determined that all volume objects for non-root volumes have been processed, then control returns to the initialize a domain controller prefix table routine 1104.

Now that the domain controller prefix table 1102 has been initialized with the domain's root volume local information (step 1502) and the domain's non-root volume local information (step 1504), the initialize a domain controller prefix table routine 1104 invokes an initialize inter-domain information routine 1110 (step 1506).

Figure 13:
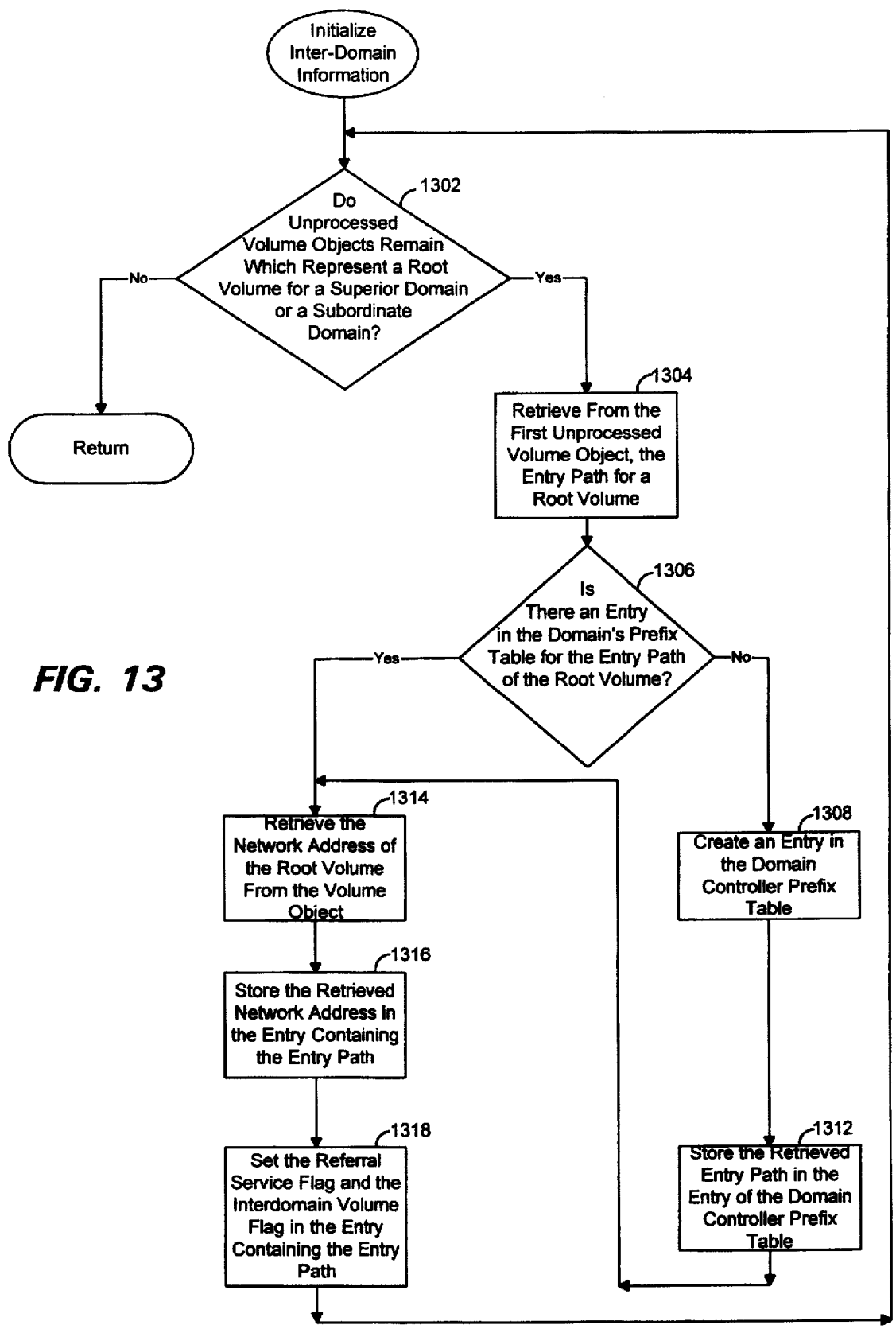
FIG. 13 is a flow chart illustrating the steps performed by the initialize interdomain information routine of the preferred embodiment of the present invention.

FIG. 13 is a flow chart of the steps performed by the initialize inter-domain information routine 1110 that is called in step 1506. Initially, a determination is made whether unprocessed volume objects remain which represent a root volume for a domain which is immediately superior to or immediately subordinate to the domain containing the domain controller (step 1302). If unprocessed volume objects remain, the entry path for the corresponding root volume is retrieved from the first unprocessed volume object (step 1304). Next, it is determined whether there is an entry in the domain controller prefix table 1102 for the entry path of the root volume (step 1306). If there is not such an entry, an entry in the domain controller prefix table 1102 is created (step 1308). The retrieved entry path is then stored in the created entry of the domain controller prefix table 1102 (step 1312). Upon completion of step 1312, processing continues with step 1314. If in step 1306 it is determined that there is an entry in the domain controller prefix table 1102 for the entry path of the root volume, then processing continues with step 1314.

In step 1314, the network address of the root volume is retrieved from the volume object. The retrieved network address is stored in the entry of the domain controller prefix table 1102 containing the retrieved entry path (step 1316). The referral service flag is set and the inter-domain volume flag is set in the entry containing the retrieved entry path (step 1318). Upon completion of step 1318, processing continues with step 1302.

If in step 1302 it is determined that all volume objects for root volumes of immediately superior and immediately subordinate domains have been processed, control returns to the initialize a domain controller prefix table routine 1104.

Upon return of processing control from the initialize inter-domain information routine 1110, the initialize domain controller prefix table routine 1104 ends processing. While processing related to the initialize a domain controller prefix table routine ceases, processing may continue on the domain controller.

A prefix table in a workstation of the distributed system 100 is initialized with the entry point and exit points for each volume stored on the workstation, as well as the entry point of its domain.

The preferred data to store in the prefix table of a workstation is persistently stored on and retrieved from the workstation itself. The persistently stored data includes the entry path of each volume on the workstation; the entry path of the domain containing the workstation, along with the physical address of the domain controller of the domain; and the physical address of any storage device local to the workstation.

Figure 14:
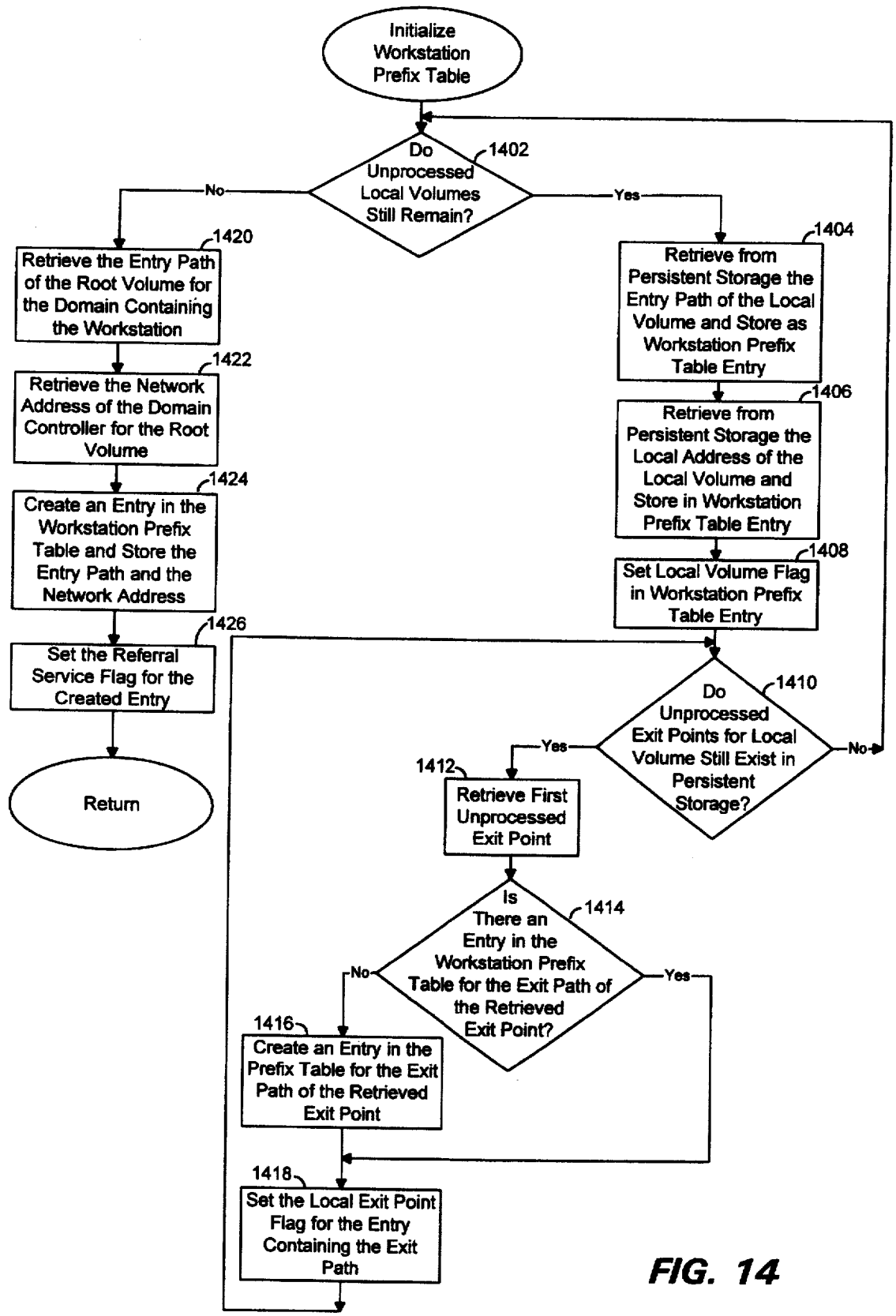
FIG. 14 is a flow chart of the steps performed by the initialize workstation prefix table of the preferred embodiment of the present invention.

FIG. 14 illustrates the preferred steps of a routine to initialize a workstation prefix table. In step 1402, the routine to initialize a workstation prefix table determines if the workstation prefix table has been initialized with information about all local volumes on the workstation. If unprocessed local volumes still remain, the routine retrieves the entry path of the unprocessed local volume from persistent storage on the workstation. The retrieved entry path is stored in the workstation prefix table (step 1404). The local address of the unprocessed local volume is retrieved from persistent storage and the local address is stored address in the prefix table (step 1406). The local volume flag is set in the workstation prefix table (step 1408). A determination is then made whether the workstation prefix table has been initialized with information about all exit points for this local volume on the workstation. If the workstation prefix table has not been initialized with information about all exit points for this local volume, information about the first unprocessed exit point is retrieved from permanent storage (step 1412). In step 1414 it is determined if there is an entry in the workstation prefix table for the exit path of the retrieved exit point. If there is not an entry in the workstation prefix table, an entry is then created in the workstation prefix table for the exit path of the retrieved exit point (step 1416). Upon completion of step 1416, processing continues with step 1418. If in step 1414 it is determined that there is an entry in the workstation prefix table for the exit path of the retrieved exit point, processing continues with step 1418.

In step 1418, the local exit point flag is set for the entry in the workstation prefix table that contains the exit path for the retrieved exit point. Upon completion of step 1418, processing continues with step 1410 again If in step 1410 it is determined that the workstation prefix table has been initialized with information about all exit points for this local volume, then processing continues with step 1402.

If in step 1402 it is determined that the workstation prefix table has been initialized with information about all local volumes on the workstation, then the entry path of the root volume for the domain containing the workstation is retrieved (step 1420). In step 1422, the network address of the domain controller for the root volume of the domain containing the workstation is retrieved. An entry is created in the workstation prefix table and the retrieved entry path is stored in the retrieved network address in the entry (step 1424). In step 1426, the referral service flag is set for the created entry in the workstation prefix table.

Thus, it will be appreciated that, although a specific embodiment of the invention has been described herein for purposes of illustration, various modifications may be made without departing from the spirit and scope of the invention. Accordingly, the invention is not limited except as by the appended claims.

We claim:

1. In a distributed system having a distributed name space of objects wherein each object has both a logical name uniquely identifying the object in the distributed name space and a corresponding address, the objects being grouped into logical domains which are organized into a hierarchical structure wherein each domain may have one superior domain in the hierarchical structure and one or more subordinate domains in the hierarchical structure, a computer implemented method for accessing an object comprising the steps of:

providing a domain controller component for each domain, each domain controller component holding a prefix table which stores an entry for a logical name in the distributed name space of a domain controller component for any immediately superior domain and an entry for the logical name in the distributed name space for any domain controller component in any immediately subordinate domain, each said entry specifying an address of the respective domain controller component;

providing a first computer component for processing requests for information from the distributed system, the first computer component including another prefix table which stores entries for prefixes of logical names in the distributed name space and each entry specifies an address of a selected object in the distributed system that is named by the prefix;

receiving a request to access the selected object at the first computer component, wherein the request includes a logical name for the selected object to be accessed in the distributed system;

determining if an entry for a prefix of the logical name for the selected object from the request is stored in the prefix table of the first computer component;

in response to a determination that an entry for a prefix of the logical name for the selected object is not stored in the prefix table of the first computer component, retrieving from the prefix table of the first computer component the address of the domain controller component for the domain containing the first computer component;

sending the logical name for the selected object from the request to the domain controller component for the domain containing the first computer component;

retrieving from the prefix table of the domain controller component for the domain containing the first computer component, an address of the selected object; and accessing the object at the address that was retrieved from prefix table of the domain controller component which contains the first computer component.

2. The method of claim 1 wherein the first computer component may directly access objects in a local address space and wherein said method further comprises the steps of:

in response to a determination that an entry for a prefix of the logical name for the selected object is stored in the prefix table of the first computer component;

identifying a longest matching prefix among the prefixes having entries in the prefix table of the first computer component;

determining whether an object associated with the longest matching prefix is stored in the local address space that is directly accessible by the first computer component;

where it is determined that the object associated with the longest matching prefix is stored in the local address space obtaining an address for a portion of the memory; and accessing the object associated with the longest matching prefix using the obtained address for the portion of memory.

3. The method of claim 2 wherein the distributed system includes a network server and the method further comprises the steps of:

where it is determined that the object associated with the longest matching prefix is not stored in the local address space that is directly accessible by the first computer component, forwarding the request to access the selected object to the network server; and attempting to resolve the logical name to an address at the network server.

4. The method of claim 3, further comprising the step of where the resolution of the logical name of the selected object to an address at the network server is successful, using the address to access the object.

5. The method of claim 4, further comprising the steps of:
where the resolution of the logical name of the selected object to an address at the network server is not successful,
retrieving from the prefix table of the first computer component the address of the domain controller component for the domain containing the first computer component;
sending the logical name of the selected object from the request to the domain controller component for the domain containing the first computer component;
retrieving from the prefix table of the domain controller component for the domain containing the first computer component, an address corresponding to the logical name of the selected object from the request; and
accessing the object at the retrieved address corresponding to the logical name from the request.

6. The method of claim 1 wherein the address of the domain controller component for the domain containing the first computer component is retrieved without broadcasting a request for the physical address.

7. The method of claim 1 wherein the step of providing a domain controller component includes the step of retrieving the logical names and the corresponding addresses of the domain controller components for the immediately superior domain and the immediately subordinate domains, wherein the method further comprises the steps of storing the retrieved logical names and corresponding addresses in the prefix table of the domain controller component.

8. The method of claim 1 wherein the logical name is a logical path name.

9. In a distributed system having its components logically partitioned into self-contained domains, wherein each domain includes a domain controller holding information about what is included in the domain and included in said components is a workstation having local storage, a method comprising the steps of:
providing a distributed file system that furnishes a distributed name space for objects in the distributed system;
receiving a request at the workstation to access a selected object in the distributed name space, said request identifying the selected object by its logical name in the distributed name space;
providing a first cache of logical names of objects and associated resolved addresses of the objects at the workstation;
accessing the first cache at the workstation to locate a longest matching portion of the logical name of the selected object to which access is requested that has already been resolved to an address;
where it is determined by accessing the first cache that a portion of the logical name of the selected object has not already been resolved to an address,
forwarding the request to a domain controller for the domain that contains the workstation;
providing a second cache at the domain controller of associated resolved addresses for logical names;
accessing the second cache to determine if a portion of the logical name of the selected object to which access is requested has already been resolved to an address;
where it is determined by accessing the second cache that a portion of the logical name of the selected object to which access is requested has been resolved to an address,
forwarding the portion of the logical name of the selected object that has been resolved and the address to which the portion of the logical name of the selected object has been resolved to the workstation;
storing the portion of the logical name and the address to which the portion of the logical name of the selected object has been resolved in the first cache at the workstation; and
repeating the above steps beginning with the accessing the first cache step.

10. The method of claim 9, further comprising the steps of:
where it is determined by accessing the first cache that a portion of the logical name of the object to which access is requested has already been resolved to an address,
determining whether the address to which the portion of the logical name of the selected object has been resolved refers to a storage location in the local storage of the workstation; and
where the address portion of the of the logical name of the selected object that has been resolved refers to a storage location in the local storage of the workstation, accessing the selected object using the address to which the portion of the logical name has been resolved.

11. The method of claim 10 wherein the distributed system further comprises a network server and the method further comprises the steps of:
where it is determined that the address of the portion of the logical name of the selected object that has been resolved refers to a storage location outside local storage of the workstation,
forwarding the logical name of the selected object to the network server; and
attempting name resolution of the logical name of the selected object into an address at the network server.

12. The method of claim 11, further comprising the steps of where the name resolution at the network server is successful in resolving the logical name of the selected object to an address, using the address to access the selected object.

13. The method of claim 11, further comprising the steps of:
where the name resolution at the network server is not successful in resolving the logical name of the selected object to an address,
forwarding the logical name of the selected object to a second domain controller for a domain which includes a portion of the distributed name space identified by the portion of the logical name of the selected object that was determined to be resolved by examining the first cache at the workstation;
providing another cache of logical names and associated resolved addresses at the second domain controller;
accessing the cache at the second domain controller to find an address for a portion of the logical name of the selected object that has already been resolved;
forwarding the address that was found at the cache of the second domain controller to the workstation; and
storing the address that was forwarded and associated portion of the logical name of the selected object in the first cache at the workstation.

14. In a distributed system organized hierarchically into logical domains, including a first domain and a second domain, a method comprising the steps of:

providing a distributed name space of objects wherein each object has a logical name that identifies the object within the name space and a corresponding address;

providing a domain controller for each domain, each domain controller holding a prefix table storing entries wherein each entry holds an address for a corresponding prefix of a logical name;

receiving a request to access an object in the first domain from the second domain;

providing a first referral in the prefix table in the domain controller of the second domain that refers to the domain controller in the first domain;

accessing the prefix table in the domain controller of the second domain to obtain the first referral that refers to the domain controller in the first domain;

providing a second referral in the prefix table in the domain controller in the first domain;

using the first referral to access the prefix table in the domain controller in the first domain to obtain the second referral; and using the second referral to access the object.

15. The method of claim 14 wherein the distributed system includes a third domain and the second referral refers to a logical name in the third domain.

16. The method of claim 15 wherein the distributed system includes a network server in the first domain wherein the second referral refers to the network server in the first domain and wherein the step of using the second referral to access the object comprises the step of using the second referral to access the network server in the first domain and accessing the object via the network server.

* * * * *